US008358284B2

(12) United States Patent
Jeong et al.

(10) Patent No.: US 8,358,284 B2
(45) Date of Patent: Jan. 22, 2013

(54) TOUCH SCREEN PANEL

(75) Inventors: Hwan-Hee Jeong, Yongin (KR);
Tae-Hyeog Jung, Yongin (KR);
Sung-Ku Kang, Yongin (KR);
Jung-Mok Park, Yongin (KR);
Choon-Hyop Lee, Yongin (KR); Shawn Kim, Yongin (KR); Sang-Kook Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 544 days.

(21) Appl. No.: 12/591,159

(22) Filed: Nov. 10, 2009

(65) Prior Publication Data
US 2010/0182256 A1 Jul. 22, 2010

(30) Foreign Application Priority Data

Jan. 16, 2009 (KR) .................. 10-2009-0003644

(51) Int. Cl.
*G06F 3/045* (2006.01)

(52) U.S. Cl. ...................................... 345/174; 345/176
(58) Field of Classification Search ............. 345/89–98, 345/173–178, 204–215; 178/18.01–18.09, 178/20.01–20.04
See application file for complete search history.

(56) References Cited

U.S. PATENT DOCUMENTS

| 5,374,787 | A | 12/1994 | Miller et al. | |
|---|---|---|---|---|
| 6,879,096 | B1 * | 4/2005 | Miyazaki et al. | 313/495 |
| 6,894,682 | B2 | 5/2005 | Nakajima et al. | |
| 6,970,160 | B2 * | 11/2005 | Mulligan et al. | 345/173 |
| 7,339,579 | B2 | 3/2008 | Richter et al. | |
| 7,864,503 | B2 * | 1/2011 | Chang | 361/288 |
| 2005/0084659 | A1 * | 4/2005 | Dunkel | 428/209 |
| 2006/0077153 | A1 * | 4/2006 | Cummings et al. | 345/85 |
| 2008/0122661 | A1 * | 5/2008 | Han | 341/22 |
| 2008/0264699 | A1 * | 10/2008 | Chang et al. | 178/18.01 |

FOREIGN PATENT DOCUMENTS

| KR | 1020020057247 A | 7/2002 |
|---|---|---|
| KR | 1020030061070 A | 7/2003 |
| KR | 10-2004-0042486 | 5/2004 |
| KR | 1020040042486 A | 5/2004 |
| KR | 1020080049248 A | 6/2008 |
| KR | 1020080110477 A | 12/2008 |

OTHER PUBLICATIONS

Korean Office Action dated Aug. 31, 2010 for the corresponding Korean patent application No. 10-2009-0003644 and Request for Entry of the Accompanying Office Action herewith.
Korean Office Action issued by KIPO, dated Feb. 26, 2011, corresponding to Korean Patent Application No. 10-2009-0003644, together with Request for Entry.

* cited by examiner

*Primary Examiner* — Vijay Shankar
(74) *Attorney, Agent, or Firm* — Robert E. Bushnell, Esq.

(57) ABSTRACT

The touch screen panel according to the embodiment of the present invention includes a plurality of coupling patterns arranged on a transparent substrate in an island shape, an insulating film formed on the coupling patterns and having contact holes arranged corresponding to end portions of the coupling patterns, and first and second sensing patterns formed on the insulating film. The second sensing pattern includes second sensing cells, and each of the second sensing cells are formed in a region of the insulating film having a pair of adjacent contact holes to be electrically coupled to coupling patterns exposed through the contact holes.

9 Claims, 2 Drawing Sheets

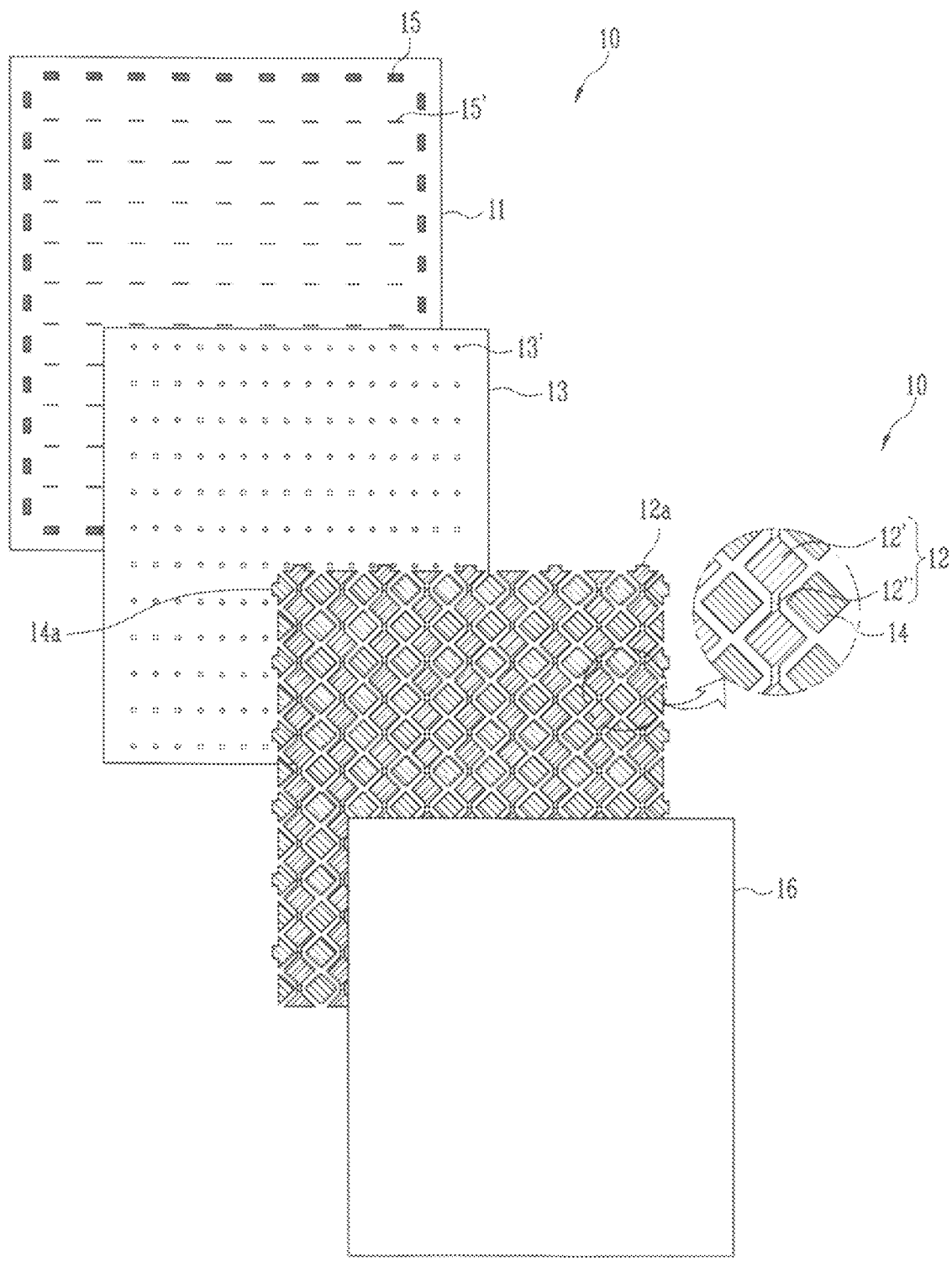

TOUCH SCREEN PANEL

CLAIM OF PRIORITY

This application makes reference to, incorporates the same herein, and claims all benefits accruing under 35 U.S.C. §119 from an application earlier filed in the Korean Intellectual Property Office on 16 Jan. 2009 and there duly assigned Serial No. 10-2009-0003644.

BACKGROUND OF THE INVENTION

1. Field of the Invention

The present invention relates to a touch screen panel, and more particularly, to a touch screen panel that reduces material costs and improves transmittance by omitting a second insulating film.

2. Description of the Related Art

A touch screen panel is an input device that a user can input his or her instruction by selecting an instructed content displayed on a screen such as an image display device, etc. using a human's finger or an object.

To this end, the touch screen panel is provided on the front face of the image display device to convert a contact position, which the human's finger or object directly contacts, into an electrical signal. Therefore, the instructed content selected on the contact position is accepted as an input signal. The touch screen panel as described above can replace an input device, e.g., a keyboard, a mouse, or the like to be coupled to the image display device to operate so that its applications are expanding widely.

A resistive type, a photosensitive type and an electrostatic capacity type have been known as a method to implement the touch screen panel.

Among others, the electrostatic capacity type touch screen panel includes a conductive sensing pattern to sense change in electrostatic capacity formed in association with other sensing patterns in the vicinity thereof or a ground electrode, etc., thereby converting a contact position into an electrical signal.

Here, in order to clearly determine the contact position on the contact surface, the sensing pattern includes first sensing patterns (X patterns) formed to be coupled along a first direction, and second sensing patterns (Y patterns) formed to be coupled along a second direction.

The first and second sensing patterns as described above are generally positioned in the same layers. In this case, the sensing patterns positioned in the same X or Y lines are coupled by forming separate coupling patterns through contact holes formed in insulating films thereon.

However, in this case, the coupling patterns are portioned on the insulating film, thus having disadvantages in that the sensing patterns are vulnerable to static electricity applied from an external apparatus and the adhesion with the insulating film deteriorates.

SUMMARY OF THE INVENTION

It is an object of the present invention to provide a touch screen panel that forms coupling patterns that couple sensing cells of first sensing patterns or second sensing patterns formed on a transparent substrate where the first sensing pattern and the second sensing pattern function as sensing electrodes of a touch screen panel. The sensing cells of the first sensing patterns (or the second sensing patterns) are coupled to each other through contact holes of an insulating film formed on upper portions of the coupling patterns, thereby improving strength of the coupling patterns against static electricity and securing contact stability with the insulating film.

In order to accomplish the above object, according to one aspect of the present invention, there is provided a touch screen panel including a plurality of coupling patterns arranged on a transparent substrate, an insulating film formed on the coupling patterns and having contact holes arranged corresponding to end portions of the coupling patterns, first sensing patterns formed on the insulating film, and second sensing patterns formed on the insulating film. Each of the second sensing patterns is disposed in a region of the insulating film having a pair of adjacent contact holes, and the each of the second sensing patterns is electrically coupled to coupling patterns through the contact holes.

At this time, each of the first sensing patterns may include a first sensing cell and a first coupling line coupling the first sensing cell to a first sensing cell of another of the first sensing patterns arranged in a first direction. Each of the second sensing patterns may include a second sensing cell. The second sensing patterns are disposed alternately with the first sensing cells so as not to overlap with the first sensing cells of the first sensing patterns.

The touch screen panel may further include a plurality of metal patterns formed on the transparent substrate. The metal patterns are disposed on edge regions of the first and second sensing patterns. Each of the metal patterns is coupled to the first sensing pattern or to the second sensing pattern.

The plurality of coupling patterns and metal patterns may be formed in the same layer. Each of the coupling patterns and the metal patterns may be made of a material having a lower specific resistance than materials of the first and second sensing patterns.

Also, the first and second sensing patterns are made of a transparent electrode material having a thickness of 100 to 300 angstroms (Å), and the transparent electrode material includes indium tin oxide (ITO).

With the present invention as describe above, coupling patterns that couple first sensing pattern (or second sensing pattern) are formed on a transparent substrate, and the sensing cells of the first sensing pattern (or the second sensing pattern) are electrically coupled to each other through contact holes of an insulating film formed on upper portions of the coupling patterns. Thereby, the present invention has advantages that strength of the coupling patterns against static electricity can be improved and contact stability with the insulating film can be secured.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is an exploded plan view of a touch screen panel according an embodiment of the present invention.

DETAILED DESCRIPTION OF THE INVENTION

Figure 1A:
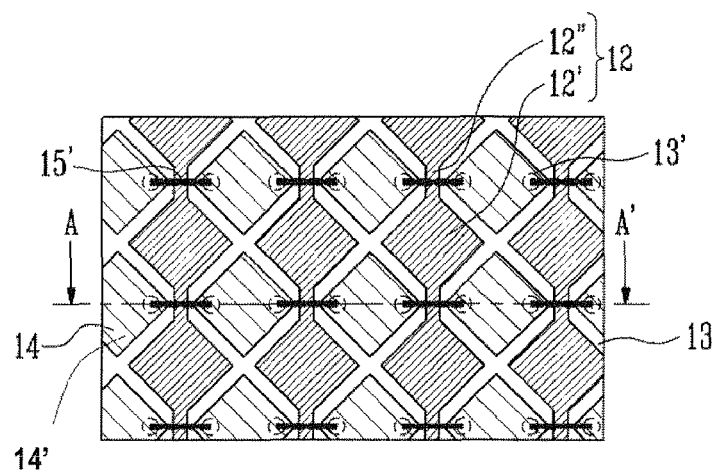
FIG. 1A is a plan view showing a disposition of sensing patterns according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, exemplary embodiments according to the present invention will be described in more detail with reference to the accompanying drawings.

Figure 1B:
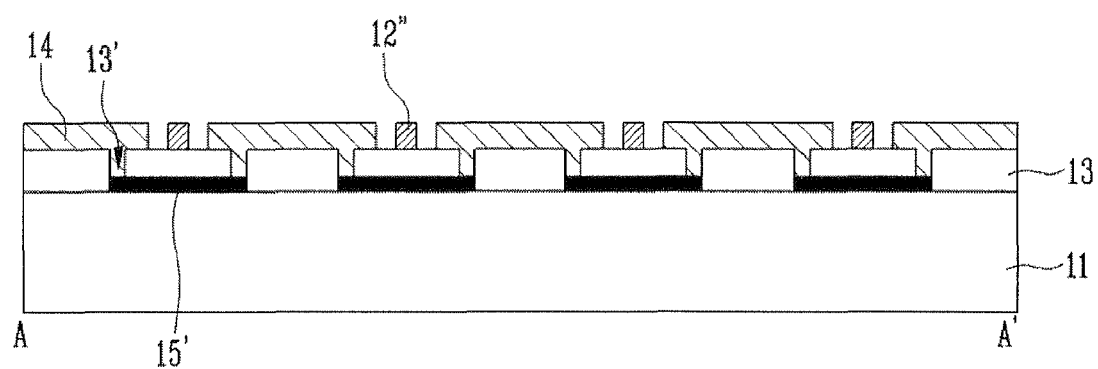
FIG. 1B is a cross-sectional view of a specific portion (A-A') of FIG. 1A.

FIG. 1A is a plan view showing a disposition of sensing patterns according to an embodiment of the present invention, and FIG. 1B is a cross-sectional view of a specific portion (A-A') of FIG. 1A.

Referring to FIGS. 1A and 1B, the sensing patterns according to the embodiment of the present invention include first and second sensing patterns 12 and 14 that are alternately disposed. As shown in FIG. 1A, each of the first sensing patterns includes a first sensing cell 12' and a first coupling line 12". In the first sending patterns 12, sensing cells having the same X-coordinate are coupled to each other, and in the second sensing pattern 14, sensing cells having the same Y-coordinate are coupled to each other.

In other words, the first sensing patterns 12 include arrays of first sensing cells 12', with each of the arrays of the first sensing cells 12' disposed along a first direction (along Y-axis), and first coupling lines 12", each of which couples adjacent first sensing cells 12' having the same X-coordinate. The second sensing patterns 14 include arrays of second sensing cells 14', with each of the arrays of the second sending cells 14' disposed along a second direction (along X-axis).

At this time, in the embodiment of the present invention, the first sensing patterns 12 and the second sensing patterns 14 are disposed in the same layer. The first and second sensing patterns 12 and 14 are made of a transparent material in order to implement the operation of the touch screen panel, wherein it is preferable that the first and second sensing patterns 12 and 14 are made of indium tin oxide (hereinafter, referred to as ITO).

Also, in order make the first sensing patterns 12 and the second sensing patter 14 function as the sensing electrodes, the respective sensing cells disposed in the first direction or the second direction should be electrically coupled to each other.

The first sensing cells 12' are coupled to each other by the first coupling lines 12", and the second sensing cells 14' of the second sensing patterns 14 are formed in the same layer as the first sensing cells 12'. Therefore, coupling lines that connect the second sensing cells 14 cannot be formed in the same layer in order to avoid short circuit with the first coupling lines 12'.

Therefore, the present invention is characterized in that the coupling patterns 15' that electrically couple the second sensing cells 14' having the same Y coordinate are formed in a different layer from the first sensing patterns 12. For example, the coupling patterns 15' can be formed on a lower layer of the first and second sensing patterns 12 and 14.

In other words, in the embodiment of the present invention, the coupling patterns 15' are formed on a transparent substrate 11, and an insulating film 13 is formed on the transparent substrate 11 and the coupling patterns 15'.

At this time, the coupling patterns 15' may be made of ITO such as the first and second sensing patterns 12 and 14, or may be made of a metal material having resistance value lower than the ITO. For example, the material of the coupling patterns 15' may have a lower specific resistance (or resistivity) than the materials of the first and second sensing patterns 12 and 14 (materials of the first and second sensing cells)

Also, although the coupling patterns 15' may be formed in a rectangular bar shape as shown in FIGS. 1A and 1B, this is merely one embodiment but the present invention is not limited thereto. In other words, the width of the end portion of the coupling patterns 15' that is the portion exposed by the contact hole 13' of the insulating film 13 may be implemented to be wider than the width of other portions of the coupling patterns 15'.

The coupling patterns 15' as described above cross the first coupling lines 12" of the first sensing patterns 12. It is preferable that the width of the coupling patterns 15' is minimized in order to reduce the effect of parasitic capacitance generated by the intersection.

However, when the width of the coupling patterns 15' is minimized as described above, line resistance of the second sensing patterns 14 becomes higher, consequently causing a problem that sensing sensitivity that implements the function of the touch screen panel deteriorates.

Therefore, it is preferable that the coupling patterns 15' are made of a conductive material having a lower resistance.

In this case, the coupling patterns 15' may be made of the same material as metal patterns 15 (shown in FIG. 2) that are formed on edge regions of the first sensing patterns 12 and the second sensing patterns 14, which supply sensed signals to a driving circuit (not shown). In this case, the coupling patterns 15' are formed in the same layer as the metal patterns 15 through the same process so that an additional mask process is not required for forming the coupling patterns 15'.

The present invention can prevent the line resistance from being increased since the coupling patterns 15' are not made of the same transparent conductive material as the first and second sensing patterns 12 and 14, and also can overcome the disadvantage that the mask process should be added in order to forming the coupling patterns 15'.

FIG. 2 is an exploded plan view of a touch screen panel according an embodiment of the present invention.

In the embodiment of the present invention, the coupling patterns 15' will be described as being made of conductive material other than ITO by way of example.

Referring to FIG. 2, the touch screen panel 10 according to the embodiment of the present invention includes a transparent substrate 11, a plurality of coupling patterns 15' arranged on the transparent substrate 11 in an island shape, a first insulating film 13 having contact hole 13', each of which is formed in a region corresponding to end portion of the each coupling pattern 15', and first and second sensing patterns 12 and 14 formed on the first insulating film 13.

At this time, second sensing cells 14' of the second sensing patterns 14 are formed in a region having a pair of adjacent contact holes 13' so that the second sensing cells 14' can be electrically coupled to the coupling patterns 15' through the contact holes 13'. Specifically, a portion of the coupling patterns 15' exposed through the contact holes 13' can be electrically connected to the second sensing cells 14'.

Also, the touch screen panel further includes a plurality of metal patterns 15 disposed in edge regions of the first and second sensing patterns 12 and 14, which electrically couple the sensing patterns in one row unit or in one column unit to position detecting lines.

In other words, the metal patterns 15 are disposed on the edge region of the first and second sensing patterns 12 and 14, in particular, on regions corresponding to pads 12a and 14a of the first and second sensing patterns 12 and 14. The metal patterns 15 as described above electrically couples the sensing patterns 12 and 14 in one row unit or in one column unit to position detecting lines (not shown), respectively, to allow contact position detecting signals to be supplied to a driving circuit not shown, etc.

The plurality of metal patterns 15 is preferably formed through the same process as the coupling patterns 15'. Therefore, the metal patterns 15 are formed on the transparent substrate 11, and are implemented using the conductive material having a lower resistance.

The first sensing patterns 12 are formed on one surface of the first insulating film 13 to be coupled to each other along a first direction. For example, the first sensing cells 12' of the first sensing pattern 12 may be formed on the upper surface of the first insulating film 13 to be close to each other, having a regular shape such as a diamond shape.

In other words, the first sensing patterns 12 as described above includes first sensing cells 12' disposed along a first direction and first coupling lines 12" that couples adjacent first sensing cells 12' having the same X-coordinate. Here, the shape of the first sensing cells 12' is not limited to the diamond shape, but it may be implemented as various shapes that the first sensing cells 12' can be close to each other.

The first sensing patterns 12 have first pads 12a in order that they can be electrically coupled to the metal patterns 15 in the row unit. The first pads 12a of the first sensing patterns 12 may be alternately provided on the upper side or the lower side, may be positioned only on the upper side or on the lower side of the first sensing pattern 12 as shown in FIG. 2, or may be positioned on both the upper and lower sides of the first sensing pattern 12.

The second sensing patterns 14 are formed on the first insulating film 13, where the second sensing cells 14' of the first sensing patterns 12 are formed, along the second direction, but are disposed alternately with the first sensing cells 12' in order not to overlap with the first sensing cells 12'.

In other words, the second sensing patterns 14 include second sensing cells 14'. The second sensing cells 14' disposed along a second direction having the same Y coordinate are coupled by separate coupling patterns 15'. The second sensing cells 14' are formed to be close to each other, having the same diamond shape as the first sensing cells 12'.

The second sensing patterns 14 have second pads 14a in order that they can be electrically coupled to the metal patterns 15 in the column unit. The second pads 14a of the second sensing patterns 14 may be alternately provided on the left side or the right side of the second sensing patterns 14, may be positioned on only the left side or the right side of the second sensing patterns 14, or may be positioned on both the left and right sides of the second sensing patterns 14. At this time, the first sensing cells 12' are not formed on the regions where they overlap with the second sensing cells 14'. In other words, the first sensing cells 12' and the second sensing cells 14' are disposed alternately in order to cross each other.

However, when the second sensing cells 14' are formed on the first insulating film 13, each of the second sensing cells 14' is formed on the region in which the adjacent pair of contact holes 13' is provided in the first insulating film 13 so that they are electrically coupled to the exposed coupling patterns 15' through the contact holes 13'.

With the embodiment of the present invention, the coupling patterns 15' are formed on the lowest layer of the touch screen panel 10. Thereby, the present invention can improve strength against static electricity input from the external apparatus and secure contact stability with the first insulating film 13.

Meanwhile, the first and second sensing patterns 12 and 14 and the first insulating film 13 are made of a transparent material so that light emitted from a display panel (not shown), etc. disposed in the lower portion of the touch screen panel 10 can transmit the touch screen panel 10. In other words, the first and second sensing patterns 12 and 14 are made of a transparent electrode material such as indium tin oxide (hereinafter, referred to as ITO), and the first insulating film 13 is made of transparent insulating material.

The thickness thereof can be set in the range that the touch screen panel 10 (in particular, the first and second sensing patterns 12 and 14) can have a relatively low surface resistance, securing the transmittance that light from the display panel is transmitted. In other words, the thickness of the first and second sensing patterns 12 and 14 and the first insulating film 13 can be set to be optimized in consideration of the transmittance and the surface resistance.

For example, the first and second sensing patterns 12 and 14 may be formed in an indium tin oxide (hereinafter, referred to as ITO) pattern having a thickness of 100 to 300 Å, respectively, and the first insulating film 13 may be made of transparent insulating material having a thickness of 400 to 1000 angstroms (Å) (in particular, a thickness of 400 to 700 angstroms (Å)) in which optical refractive index in the range of 1.6 to 1.9 is secured. However, this is merely one embodiment but the present invention is not limited thereto. Therefore, the thickness thereof may also be changed in consideration of the transmittance and/or the surface resistance, etc.

Also, the second insulating film 16 is formed on the first and second patterns 12 and 14 to cover them. For example, the second insulating film 16 may be formed on the first and second sensing patterns 12 and 14, made of transparent insulating material having a thickness of 400 to 1000 angstroms (Å). However, the second insulating film 16 may be omitted according to the design of a product.

If the touch screen panel 10 as described above is touched by a human's finger or an object, a change in electrostatic capacity in accordance with the contact position is transferred to the driving circuit side, via the first and second sensing patterns 12 and 14, the metal patterns 15 and the position detecting lines. The change in electrostatic capacity is converted into an electrical signal by the X and Y input processing circuits (not shown), etc. so that the contact position is comprehended.

Meanwhile, a transparent ground electrode (not shown) and a third insulating film (not shown) that covers the transparent ground electrode may further be formed on the other surface opposite to one surface of the transparent substrate 11 on which the coupling patterns 15' are formed, that is, on the lower surface of the transparent substrate 11.

For example, the transparent ground electrode made of a transparent electrode material such as ITO, etc. having a thickness of 100 to 300 angstroms (Å) may be formed on the lower surface of the transparent substrate 11, and the third insulating film that covers the transparent ground electrode, having a thickness of 400 to 1000 angstroms (Å), may be formed on the lower portion of the transparent ground electrode.

However, this is merely one embodiment but the thickness of the transparent ground electrode and the third insulating film may be modified in consideration of the light transmittance, etc. Also, the transparent ground electrode and/or the third insulating film may also be omitted according to the design of a product.

The transparent ground electrode may be used in securing stability between the touch screen panel 10 and the display panel, etc., and may also be used in forming the first and second sensing patterns 12 and 14 and the electrostatic capacity according to the design method of the touch screen panel 10.

In other words, in the electrostatic capacity type touch screen panel 10, in order to sense the contact position, the electrostatic capacity between the first sensing pattern 12 and the second sensing pattern 14 may be used, or the electrostatic capacity between the first and second sensing patterns 12 and 14 and the transparent ground electrode may be used, wherein this may be variously modified.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen panel, comprising:
   a plurality of coupling patterns arranged on a transparent substrate;
   an insulating film formed on the transparent substrate and covering the coupling patterns, the insulating film having contact holes, a portion of each of the coupling patterns being exposed through one of the contact holes;
   first sensing patterns formed on the insulating film;
   second sensing patterns formed on the insulating film, each of the second sensing patterns covering one of the contact holes, the each of the second sensing patterns being connected to one of the coupling patterns through the one of the contact holes; and
   a plurality of metal patterns formed on the transparent substrate, the plurality of the coupling patterns and the metal patterns being formed in the same layer, each of the coupling patterns and the metal patterns being made of a material having a lower specific resistance than materials of the first and second sensing patterns.

2. The touch screen panel as claimed in claim 1, wherein each of the first sensing patterns comprises:
   a first sensing cell; and
   a first coupling line coupling the first sensing cell to a first sensing cell of another of the first sensing patterns arranged in a first direction.

3. The touch screen panel as claimed in claim 1, wherein the second sensing patterns are disposed alternately with the first sensing cell of the first sensing patterns so as not to overlap with the first sensing cell of the first sensing patterns.

4. The touch screen panel as claimed in claim 1, wherein each of the second sensing patterns comprises a second sensing cell.

5. The touch screen panel as claimed in claim 1, wherein:
   the metal patterns are disposed on edge regions of the first and second sensing patterns, each of the metal patterns being coupled to the first sensing patterns or to the second sensing patterns.

6. The touch screen panel as claimed in claim 1, wherein the plurality of coupling patterns are made of a transparent electrode material.

7. The touch screen panel as claimed in claim 6, wherein the second sensing patterns are disposed on the same layer of the first sensing patterns.

8. The touch screen panel as claimed in claim 1, wherein the first and second sensing patterns are made of a transparent electrode material, each of the first and second sensing patterns having a thickness of 100 angstroms to 300 angstroms.

9. The touch screen panel as claimed in claim 8, wherein the transparent electrode material includes indium tin oxide (ITO).

* * * * *